(No Model.) 2 Sheets—Sheet 1.

J. COUP.
CAR COUPLING.

No. 361,141. Patented Apr. 12, 1887.

Witnesses
Fred G. Dieterich
Wm. E. Dyre

Inventor
John Coup
By his Attorneys
Johnston, Reinohl & Dyre (No Model.) 2 Sheets—Sheet 2.
J. COUP.
CAR COUPLING.

No. 361,141. Patented Apr. 12, 1887.

Witnesses
Fred G. Dieterich
Wm E. Dyre

Inventor
John Coup
By his Attorneys
Johnston, Reinohl & Dyre

UNITED STATES PATENT OFFICE.

JOHN COUP, OF NEW YORK, N. Y., ASSIGNOR OF ONE-FOURTH TO ELIZABETH M. CARRINGTON, OF SAME PLACE.

CAR-COUPLING.

SPECIFICATION forming part of Letters Patent No. 361,141, dated April 12, 1887.

Application filed September 23, 1886. Serial No. 214,338. (No model.)

*To all whom it may concern:*

Be it known that I, JOHN COUP, a citizen of the United States, residing at New York, in the county of New York and State of New York, have invented certain new and useful Improvements in Car-Couplings; and I do hereby declare the following to be a full, clear, and exact description of the invention, such as will enable others skilled in the art to which it appertains to make and use the same.

This invention relates to car-couplings, and has for its object the construction of a coupling provided with a hook adapted for engaging with a cam and a link for engagement with ordinary draw-heads provided with a pin.

The invention is designed as an improvement on the style of couplings known as the "Coup coupling;" and it consists in certain constructions hereinafter described, and particularly pointed out in the claims.

Figure 1:
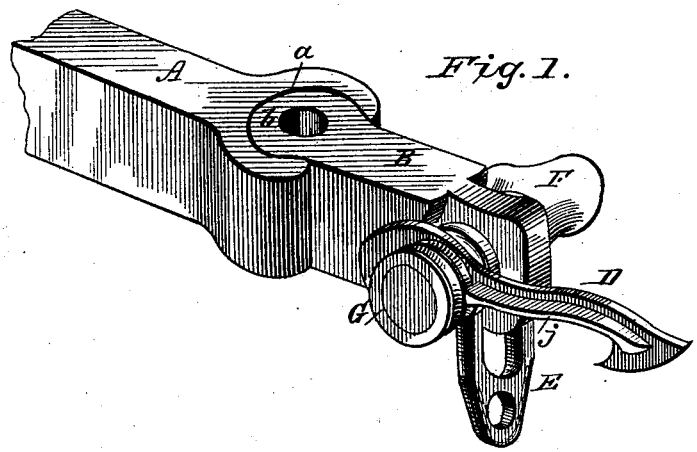
Figure 2:
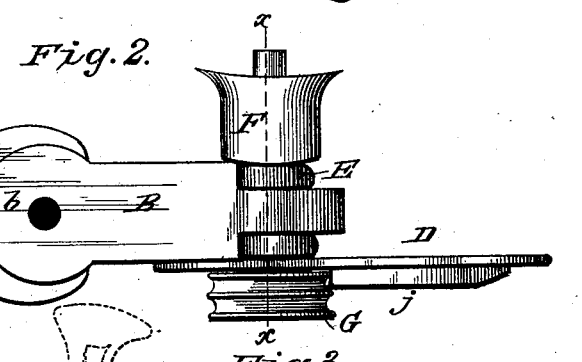
Figure 3:
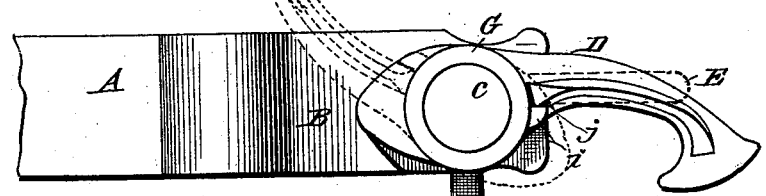
Figure 4:
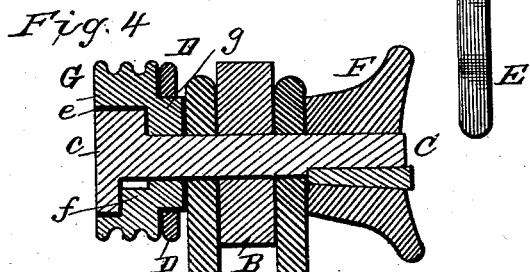
Figure 5:
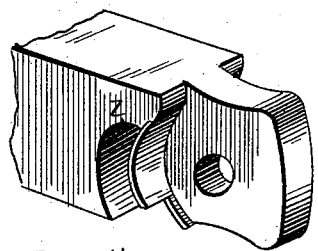
Figure 6:
Figure 7:
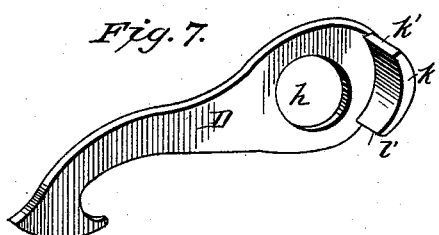
Figure 8:
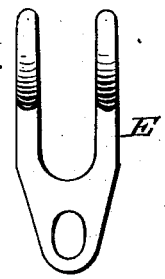
Figure 9:
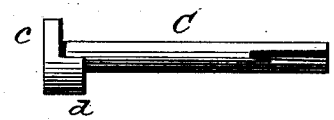
Figure 10:
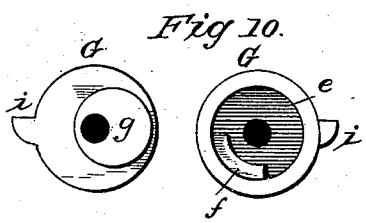
Figure 11:
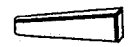

In the accompanying drawings, which form a part of this specification, Figure 1 is a perspective showing the hook in position for automatic coupling and the link hanging down. Fig. 2 is a plan view; Fig. 3, a side view; Fig. 4, a vertical cross-section on line $x\,x$, Fig. 2; Fig. 5, a perspective of the front end of the draw-head; Fig. 6, an end view of the pallet-shaped cam; Fig. 7, a side view of the hook; Fig. 8, a plan view of the link; Fig. 9, a side view of the assembling-pin. Fig. 10 represents opposite end views of the actuating-wheel, and Fig. 11 a side view of a key for holding the cam and the several parts in position on the assembling-pin.

Reference being had to the drawings and the letters marked thereon, A represents one or the rear section of the draw-head, the front end of which is provided with semi-cylindrical seat $a$.

B is the front section, the rear end of which is provided with a projection, $b$, corresponding with the seat in the section A.

C is an assembling-pin, which passes transversely through the front end of the section B of the draw-head, and upon it are mounted the hook D, the link E, the cam F, and the actuating-wheel G. One end of the pin C is provided with a cylindrical head, $c$, from the inner side of which projects a semi-cylindrical lug, $d$, and the actuating-wheel G is provided with a cylindrical recess, $e$, in which is a fixed projection, $f$, with which the lug $d$ engages when the wheel G is rotated. The opposite side of the wheel G is provided with an eccentric cam, $g$, which engages with the eye $h$ of the hook D, and from the periphery of the wheel projects a lug, $i$, which engages with a projection on the hook D—in the present instance with the rib $j$ on one side of said hook—for raising it out of engagement with the cam F on an adjacent car. The detail construction and operation of the several parts referred to are fully shown and described in my application No. 188,180, filed January 11, 1886, and the novel features thereof are therein claimed.

The novel features of construction in this application relate to means for operating the link for coupling with cars provided with draw-heads having the ordinary coupling-pin, and were originally presented in my application hereinbefore referred to.

On the rear end of the hook D is formed a lug, $k$, which projects laterally from the inner side thereof. The upper end, $k'$, of said lug strikes the upper end of the groove $l$ in the side of the front section, B, of the draw-head, and supports the hook in position for automatic coupling, as shown in Figs. 1 and 3.

When it is desired to attach a car to a train that is not provided with my automatic coupling, but with the ordinary pin-coupling, the actuating-wheel G is revolved, and the lug $i$ on the periphery of said wheel engages with the projecting rib $j$ on the hook and carries it up until the lower edge, $l'$, of the lug $k$ strikes the link E, when the further revolution of the wheel G will carry the hook D rearwardly and the link into the position in which both the hook and link are shown in dotted lines in Fig. 3. The link E is then in position for engagement with an ordinary pin-coupling. It will be observed that when the link is in position for coupling, the hook D is thrown back out of the way, so that it cannot interfere with the train-men while in the act of coupling, and that when the hook is in position for automatic coupling the link is suspended vertically from the pin C and cannot interfere with the hook. After the cars as thus coupled have been uncoupled, and it is desired to prepare for engagement with my automatic coupling, the wheel G is rotated in the reverse direction, when the lug $k$ will strike the opposite side of the projection $j$ and carry the hook D forward until it assumes the position shown in full lines in Figs. 1, 2, and 3, when it is ready for service.

I am aware that heretofore couplings have been provided with a hook and a link for alternate use, and I do not therefore broadly claim such a construction.

Having thus fully described my invention, what I claim is—

1. In a car-coupling, a link mounted upon a transverse pin in the draw-head, in combination with an actuating-wheel and a hook having a lateral projection for engaging with said link, substantially as described.

2. In a car-coupling, a link mounted upon a transverse pin in the draw-head, in combination with an actuating-wheel having a projecting lug on its periphery and a hook having lateral projections on opposite sides for engagement with said link and said lug on the actuating-wheel, substantially as described.

3. In a car-coupling, a draw-head having a groove in one side thereof, in combination with a hook having a lateral projection on the rear end thereof, said groove and projection being arranged to support the hook in position for automatic coupling, substantially as described.

4. In a car-coupling, a hook provided with lateral projections on opposite sides of its axis and on opposite sides of the hook, in combination with a link and an actuating-wheel provided with a lug for operating said hook, substantially as described.

5. In a car-coupling, the combination of a link, E, a hook, D, provided with a laterally-projecting lug, $k$, and projections $j$, an actuating-wheel, G, having a peripheral lug, $i$, and an assembling-pin, substantially as described.

In testimony whereof I affix my signature in presence of two witnesses.

JOHN COUP.

Witnesses:
EDMOND C. BROWN,
J. E. M. BOWEN.